(12) United States Patent
Nakamura et al.

(10) Patent No.: US 9,673,747 B2
(45) Date of Patent: Jun. 6, 2017

(54) CONTROL APPARATUS OF ROTARY MACHINE

(71) Applicant: DENSO CORPORATION, Kariya, Aichi-pref. (JP)

(72) Inventors: Kouichi Nakamura, Obu (JP); Takashi Suzuki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/819,128

(22) Filed: Aug. 5, 2015

(65) Prior Publication Data

US 2016/0043670 A1 Feb. 11, 2016

(30) Foreign Application Priority Data

Aug. 7, 2014 (JP) .................. 2014-161347

(51) Int. Cl.
*H02H 7/08* (2006.01)
*B60L 9/00* (2006.01)
*H02P 27/08* (2006.01)
*B62D 5/04* (2006.01)
*H02P 29/032* (2016.01)

(52) U.S. Cl.
CPC ............ *H02P 27/085* (2013.01); *B62D 5/046* (2013.01); *B62D 5/0484* (2013.01); *B62D 5/0487* (2013.01); *H02P 29/032* (2016.02)

(58) Field of Classification Search
CPC ....... B62D 5/0463; H02P 6/142; H02P 6/085; H02P 27/08; H02H 7/0851; B23K 11/252

USPC ....................... 318/400.21, 400.22
See application file for complete search history.

(56) References Cited

U.S. PATENT DOCUMENTS

| 5,068,777 A | 11/1991 | Ito |
| 2008/0130183 A1* | 6/2008 | Kawashima .......... H02M 5/458 361/79 |
| 2010/0027170 A1 | 2/2010 | Kishimoto |
| 2011/0025240 A1 | 2/2011 | Furukawa et al. |
| 2011/0156629 A1 | 6/2011 | Satou et al. |

(Continued)

FOREIGN PATENT DOCUMENTS

| JP | 2004-048885 A | 2/2004 |
| JP | 2007-028733 A | 2/2007 |

(Continued)

*Primary Examiner* — Eduardo Colon Santana
*Assistant Examiner* — Cortez Cook
(74) *Attorney, Agent, or Firm* — Knobbe, Martens, Olson & Bear, LLP

(57) ABSTRACT

A control apparatus of a rotary machine controls drive of the rotary machine with winding groups. The control apparatus includes electric power converters in multiple systems, a failure detection portion, and a controller. The electric power converter has switching elements in an upper arm and a lower arm, and converts direct current power. The failure detection portion detects a failure of an electric power converter or a failure of a winding group. The controller operates the switching elements and controls electricity supply. When the failure detection portion detects the failure, the controller stops output to an electric power converter in a failure system, and the controller reduces a total number of times of switching per unit time of the switching elements in a normally operating system.

10 Claims, 13 Drawing Sheets

(56) References Cited

U.S. PATENT DOCUMENTS

| | | | |
|---|---|---|---|
| 2012/0049782 A1* | 3/2012 | Suzuki | H02M 1/14 318/807 |
| 2013/0030633 A1* | 1/2013 | Yamamoto | B60W 10/08 701/22 |
| 2013/0200827 A1* | 8/2013 | Kezobo | H02P 29/0241 318/400.21 |
| 2013/0200830 A1 | 8/2013 | Suzuki et al. | |
| 2013/0264974 A1 | 10/2013 | Suzuki | |
| 2013/0299271 A1 | 11/2013 | Endo et al. | |
| 2014/0009093 A1 | 1/2014 | Suzuki | |
| 2015/0298727 A1 | 10/2015 | Kimpara et al. | |

FOREIGN PATENT DOCUMENTS

| | | |
|---|---|---|
| JP | 2008-154431 A | 7/2008 |
| JP | 2012-101730 A | 5/2012 |
| JP | 5521914 B2 | 6/2014 |

\* cited by examiner

NORMAL DRIVE (TWO SYSTEMS)

SINGLE SYSTEM DRIVE

CONTROL APPARATUS OF ROTARY MACHINE

CROSS REFERENCE TO RELATED APPLICATION

This application is based on Japanese Patent Application No. 2014-161347 filed on Aug. 7, 2014, and Japanese Patent No. 5045799 (corresponding to US2012/0049782A1), the disclosure of which are incorporated herein by reference.

TECHNICAL FIELD

The present disclosure relates to a control apparatus controlling a drive of a rotary machine.

BACKGROUND

Patent literature 1: JP 2013-219905A (corresponding to US2013/0264974A1).

Conventionally, a PWM control in a control apparatus of a rotary machine controls a switching timing of a switching element in an electric power converter such as an inverter, so that electricity supply to the rotary machine is controlled. The PWM control generates a duty signal based on a voltage instruction value. The duty signal is a ratio of on/off cycles regarding a switching period. The PWM control turns on and off of the switching element by comparing the duty signal with a carrier wave such as a triangular wave, a saw tooth wave.

In the PWM control, as the PWM frequency, which is a frequency of the carrier wave, is set higher, that is, as a cycle length is set shorter, controllability is improved. For example, patent literature 1 discloses a frequency of a carrier wave may be set to 20 kHz and a cycle length may be set to 50 µs, for example.

The inventors of the present application have found the following.

When the PWM frequency increases, the number of times of switching per unit time may increase and a switching loss may increase. In a normal drive status, in order to improve controllability, a frequency of, for example, 20 kHz is used.

In a control apparatus of a motor that generates a steering assist torque used in electric power steering apparatus of a vehicle, especially when the control apparatus is attached to a steering column, since the control apparatus is disposed close to a driver, so that the driver and a passenger may be less likely to hear an operation sound, it may be preferable to use the PWM frequency of 20 kHz or more for the purpose of silence.

It is supposed that the control apparatus of the rotary machine includes multiple systems of electric power converters, and controls electricity supply to multiple winding groups corresponding to the multiple systems. In addition, it is supposed that an electric power converter or a winding group in any one of the multiple systems gets out of order, and the rotary machine is driven only by a normally operating system. Incidentally, the normally operating system means a system that operates normally. For an electric power steering apparatus, the above situation may correspond to a case where a failure has occurred in either system during travelling, a driver performs an evacuation travel to a vehicle dealer or the like while ensuring an assist function of a steering torque only by the normally operating system. In this situation, it may be desired to improve power efficiency by reducing the switching loss in the electric power converter of the normally operating system and to prevent heat generation, rather than controllability and silence.

SUMMARY

It is an object of the present disclosure to provide a control apparatus controlling a drive of a rotary machine that includes multiple systems of electric power converters and includes multiple winding groups. The control apparatus reduces a switching loss of the electric power converter in a normally operating system when an electric power converter or a winding group in any one of the systems gets out of order.

According to the present disclosure, a control apparatus of a rotary machine is provided. The control apparatus controls drive of the rotary machine that has multiple winding groups. The control apparatus of a rotary machine includes electric power converters in multiple systems, a failure detection portion, and a controller. Each of the electric power converters has a switching element in an upper arm and a switching element in a lower arm, and converts direct current power by a switching operation to supply to a corresponding winding group that corresponds to each of the electric power converters. The switching element in the upper arm and the switching element in the lower arm are bridge connected. The failure detection portion detects a failure of an electric power converter or a failure of a winding group. The controller operates the switching elements in the electric power converters and controls electricity supply to the winding groups in the rotary machine for each of the multiple systems. When the failure detection portion detects the failure of the electric power converters or the failure of the winding group in any one of the systems, the controller stops output to an electric power converter in a failure system of the electric power converters, and the controller reduces a total number of times of switching per unit time of the switching elements in an electric power converter in a normally operating system of the electric power converters, as compared to a normal drive status. In the normal drive status, all of the electric power converters and all of the winding groups in the systems operate normally.

According to the control apparatus of the rotary machine, the number of times of switching per unit time is reduced and the switching loss in the electric power converter of the normally operating system is reduced. It may be possible to improve power efficiency and to prevent heat generation, rather than controllability and silence.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
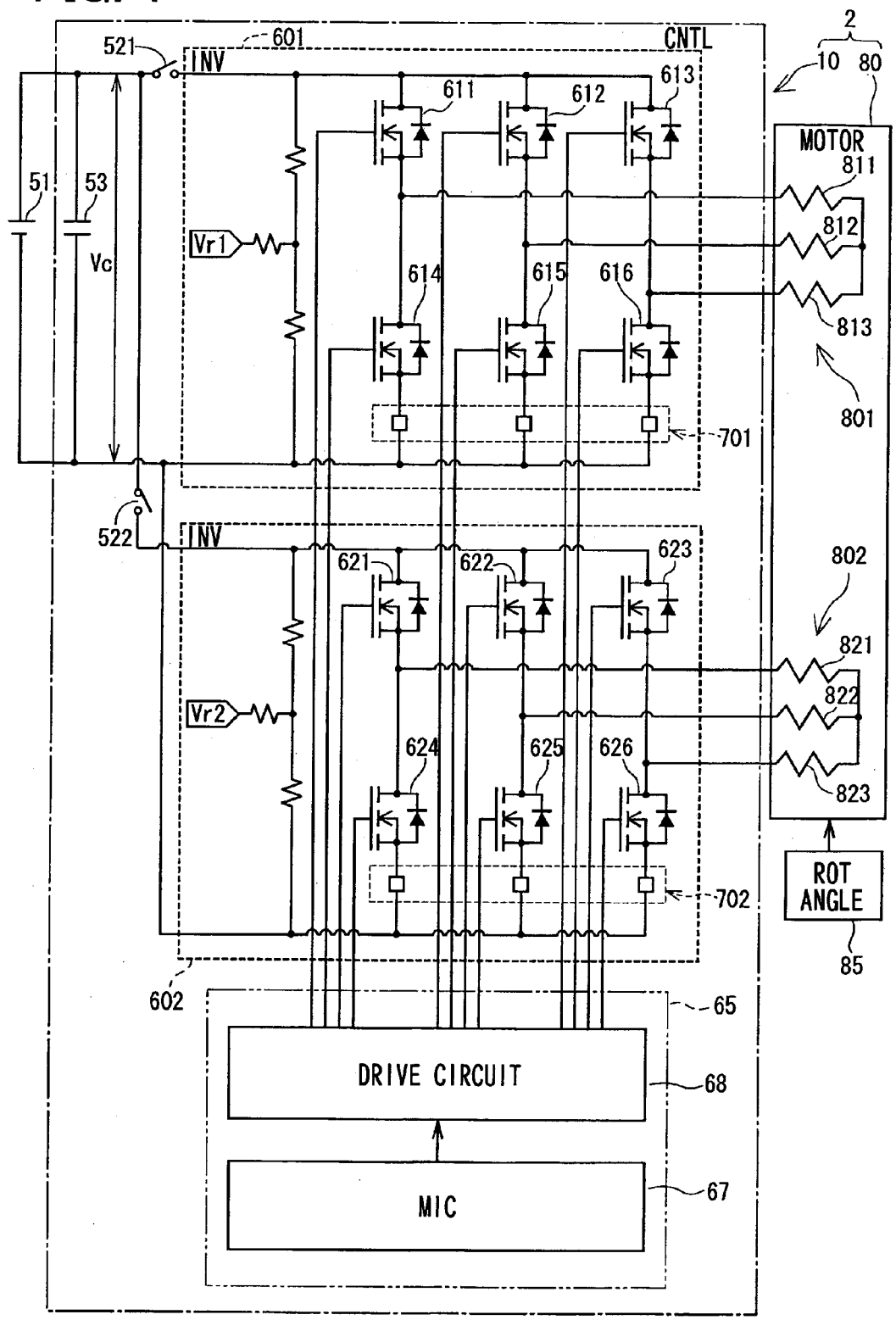
FIG. 1 is a diagram schematically illustrating a circuit of inverters of two systems controlled by a motor control apparatus in present embodiments.

Hereinafter, it is supposed that a control apparatus of a rotary machine in the present disclosure is used in an electric power steering (EPS) apparatus in a vehicle. The embodiments will be described with referring to the drawings.

A configuration common to each embodiments will be explained with referring to FIG. 1 and FIG. 2.

(Common Configuration)

In the present embodiment, a steering system 90 includes an electric power steering apparatus 1. FIG. 2 illustrates a whole structure of the steering system 90. A steering shaft 92 is connected to a steering wheel 91. The steering shaft 92 includes a torque sensor 94 that detects a steering torque. The steering shaft 92 includes a pinion gear 96 at the head of the steering shaft 92. The pinion gear 96 engages a rack shaft 97. At the both ends of the rack shaft 97, a pair of wheels 98 is rotatably connected with the rack shaft 97 through a tie rod or the like. A rotation motion of the steering shaft 92 is changed to a linear motion of the rack shaft 97 by the pinion gear 96, so that the pair of the wheel 98 is steered by an angle according to a displacement of the linear motion of the rack shaft 97.

The electric power steering apparatus 1 includes an actuator 2 and a reduction gear 89. The actuator 2 rotates a rotation shaft. The reduction gear 89 reduces speed of a rotation of a rotation shaft and transmits to the steering shaft 92.

The actuator 2 also includes an EPS motor 80 and an EPS motor control apparatus 10. The EPS motor 80 corresponds to a rotary machine that generates a steering assist torque. The EPS motor control apparatus 10 corresponds to a control apparatus of the rotary machine and drives the motor 80. The EPS motor control apparatus 10 may also be referred to as a motor control apparatus. The motor 80 in the present embodiment corresponds to a three-phase alternate current (AC) brushless motor, and rotates the reduction gear 89 in forward and backward directions.

The motor control apparatus 10 includes a controller 65 and inverters 601, 602. The inverters 601, 602 correspond to electric power converters that control electric supply to the motor 80 according to an instruction of the controller 65.

A rotation angle sensor 85 includes a magnet provided to the motor 80 and a magnetism detection element provided to the motor control apparatus 10. The magnet corresponds to a magnetism generation portion. The rotation angle sensor 85 detects a rotor rotation angle θ of the motor 80.

The controller 65 operates a switching of the inverters 601, 602 based on a torque instruction trq*, a rotation angle signal from the rotation angle sensor 85, and a feedback current, and controls electricity supply to the motor 80. Thus, the actuator 2 in the electric power steering apparatus 1 generates the steering assist torque supporting a steering of the steering wheel 91 and transmits the steering assist torque to the steering shaft 92.

Figure 2:
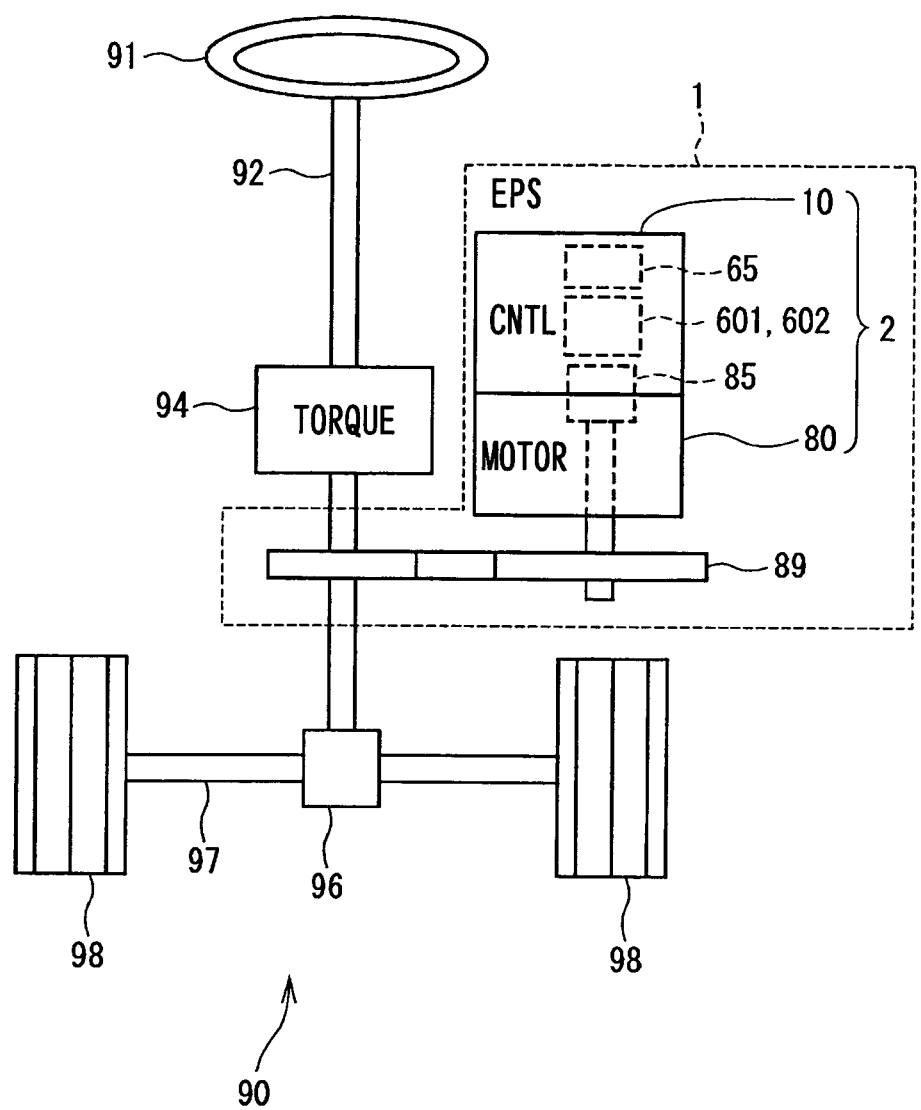
FIG. 2 is a diagram schematically illustrating an electric power steering apparatus using the motor control apparatus in the present embodiments.

As described in FIG. 1, the motor 80 has two winding groups 801, 802. The winding groups 801, 802 include a first winding group 801 and a second winding group 802. The first winding group 801 includes three-phase winding wires 811-813, corresponding to a U phase, a V phase, and a W phase. The second winding group 802 includes three-phase winding wires 821-823, corresponding to a U phase, a V phase, and a W phase. The inverter 601 is provided corresponding to the first winding group 801. The inverter 602 is provided corresponding to the second winding group 802. Hereinafter, a combination including an inverter and a three-phase winding group corresponding to the inverter is designated as a system. Electrical characteristics of the two systems are identical. A symbol in a first system includes "1" and a symbol in a second system includes "2" at the final digit of each symbol of a configuration element or physical quantity.

The motor control apparatus 10 includes a power supply relays 521, 522, a capacitor 53, inverters 601, 602, current sensors 701, 702, a controller 65.

The power supply relays 521, 522 enables to cut off power supply from the battery 51 to the inverters 601, 602 in each system. The power supply relay 521 enables to cut off power supply from the battery 51 to the inverters 601. The power supply relay 522 enables to cut off power supply from the battery 51 to the inverter 602.

The capacitor 53 and the battery 51 are connected in parallel. The capacitor 53 stores electric charge, supports the power supply to the inverters 601, 602, and suppresses a noise component such as surge current. A duty calculation portion 361 obtains voltage between electrodes Vc in the capacitor 53.

Since the inverter 601 is included in the first system, the inverter 601 may also be referred to as a first system inverter. And, regarding another component included in each system, a phrase of "a first system" or "a second system" may be added before a name of each component.

In the first system inverter 601, in order to change electricity supply to each of the winding wires 811-813 in the first winding group 801, six switching elements 611-616 are bridge connected. The switching elements 611-616 are a metal oxide semiconductor field effect transistor (MOSFET) in the present embodiment as an example. Hereinafter, the switching elements 611-616 may be referred to as MOSs 611-616 for simplicity.

As described in FIG. 1, drains of the MOSs 611-613 in an upper arm, which corresponds to a high voltage side, are connected to a positive electrode side of the battery 51. Sources of the MOSs 611-613 in the upper arm are connected to drains of the MOSs 614-616 in a lower arm, which corresponds to a low voltage side. Sources of the MOSs 614-616 in the lower arm are connected to a negative electrode side of the battery 51. A connection point between the MOSs 611-613 in the upper arm and the MOSs 614-616 in the lower arm is connected to one end of the winding wires 811-813, respectively.

The current sensor 701 detects phase current energized to the winding group 801 from the inverter 601. Although the current sensor 701 detects each of current in three phases in FIG. 1, a current sensor may detect current in two of the three phases and calculate current in the other phase using Kirchhoff's law, for example.

Input voltage Vr1 is detected by a predetermined divided voltage between a power source line and a ground line in the first system inverter 601.

Regarding a second system inverter 602, structures of switching elements (MOS) 621-626, and a current sensor 702, and a structure detecting input voltage Vr2 are similar to the structures of the first system inverter 601.

The controller 65 includes a microcomputer 67, and a drive circuit 68. The drive circuit 68 corresponds to a predriver. The microcomputer 67 performs a control calculation of each arithmetic value according to a control based on an input signal such as a torque signal, a rotation angular signal. The drive circuit 68 is connected to gates of the MOSs 611-616, 621-626, and performs a switching output based on the control of the microcomputer 67.

When one of the two systems gets out of order, the controller 65 stops an output to an inverter in a failure system and executes a control of an output to an inverter in a normally operating system. The control of the output to the inverter in the normally operating system will be explained. When the one of the two systems gets out of order, the one of the two systems is in a failure system.

(Configuration of Controller)

It is supposed that one system of the inverters 601, 602 or the winding groups 801, 802 of the two systems gets out of order. In this case, a structure of the controller 65 for maintaining an output torque of the motor 80 only with a drive of the normally operating system will be explained in each embodiment, and processing performed by the controller 65 will also be explained in each embodiment. A configuration similar in each embodiment will be given the identical symbol, and an explanation will be omitted.

First Embodiment

A motor control apparatus 10 in a first embodiment will be explained with referring to FIG. 3 to FIG. 9B.

Figure 3:
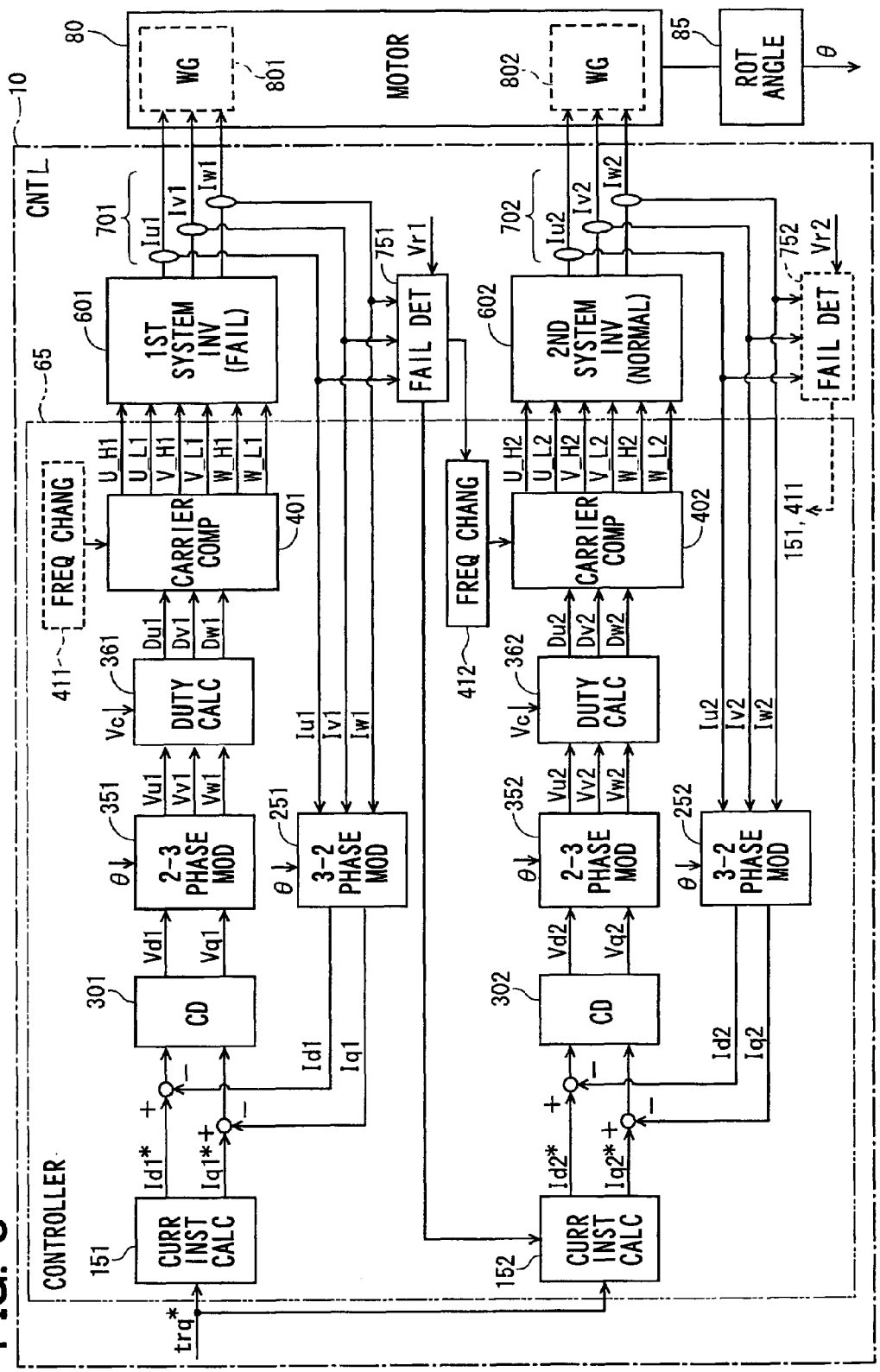
FIG. 3 is a block diagram illustrating the motor control apparatus in the first embodiment.

A control block diagram of FIG. 3 shows the controller 65 by surrounding with a two-dot chain line in the motor control apparatus 10. Thus, the inverters 601, 602, the current sensors 701, 702, and a failure detection portions 751, 752 are not included in the controller in the present disclosure. It should be noted that this explanation is limited to a conceptual distinction. It should be noted that electronic elements are not separately disposed in an actual substrate.

When all inverters and all winding groups in all systems operate normally without any failure, the inverters and the winding groups in the first system and the second system of the two systems operate normally, and this situation is referred to as a normal drive status.

On behalf of the all systems, a structure of the first system at the time of the normal drive status will be explained. The controller 65 controls electricity supply to the motor 80 with a current feedback control and a PWM control. The current feedback control uses a known current vector control. The controller 65 includes, regarding the first system, a current instruction value calculation portion 151, a three-phase to two-phase converter 251, a control device 301, a two-phase to three-phase converter 351, a duty calculation portion 361, and a carrier wave comparison portion 401. In FIG. 1, the microcomputer 67 includes the current instruction value calculation portion 151, the three-phase to two-phase converter 251, the control device 301, the two-phase to three-phase converter 351, and the duty calculation portion 361. The drive circuit 68 includes the carrier wave comparison portion 401.

The current instruction value calculation portion 151 multiplies an input by a predetermined gain based on the received torque instruction trq*, and calculates a dq-axis current instruction values Id*, Iq1* as output. Incidentally, the current instruction value calculation portion 151 may correspond to an example of a current instruction value calculation portion.

The three-phase to two-phase converter 251 performs a dq conversion. The three-phase to two-phase converter 251 converts the phase current detection values Iu1, Iv1, Iw1 in the three phases detected by the current sensor 701 to the dq-axis current detection values Id1, Iq1, based on a rotation angle θ that is feed backed from the rotation angle sensor 85.

The control device 301 receives current deviation between the dq-axis current instruction values Id1*, Iq1* and the dq-axis current detection values Id1, Iq1. In order to make the current deviation zero, the control device 301 calculates voltage instruction values Vd1, Vq1 by a PI proportional integral (PI) control calculation or the like.

The two-phase to three-phase converter 351 performs an inverse dq conversion from the dq-axis voltage instruction values Vd1, Vq1 to the three phase voltage values Vu1, Vv1, Vw1, based on the rotation angle θ, which is feed backed from the rotation angle sensor 85.

The duty calculation portion 361 calculates each phase duty instruction signals Du, Dv, Dw in a unit of % based on the three-phase instruction values Vu1, Vv1, Vw1 and a capacitor voltage Vc. For example, the each phase duty instruction signals Du, Dv, Dw have the substantially identical amplitude and are sine wave signals. Phases of the each phase duty instruction signals Du, Dv, Dw are shifted by 120 degrees.

The carrier wave comparison portion 401 compares the duty instruction signals Du, Dv, Dw in each phase and the PWM carrier wave, and calculates on/off signals U_H1, U_L1, V_H1, V_L1, W_H1, W_L1 of the MOSs 611-616 to output them to the inverter 601.

The inverter 601 operates switching of the MOSs in each phase with the on and off signal, and the designated three-phase alternating voltage is applied to the motor 80. Accordingly, the motor 80 generates a predetermined assist torque.

Regarding the second system, the configuration is similar to the configuration of the first system.

It is supposed that one of the inverter and the winding group of the two systems gets out of order.

In this case, it is supposed that the first system gets out of order, and the second system operates normally. According to this situation, the failure detection portion 751 in the first system and a PWM frequency change portion 412 in the second system are described with a solid line and will be explained in the present embodiments. The failure detection portion 752 in the second system and a PWM frequency change portion 411 in the first system are described with a chain line and are not explained in the present embodiments.

The failure includes a short circuit failure and an open failure.

The short circuit failure is defined as a condition where, in the inverter 601 or the winding group 801, any portion between wirings is conductive against a control intending a non-conductive status.

When the short circuit failure occurs in the inverter 601, a portion between a drain and a source in either of the MOSs 611-616 in upper and lower arms in each phase is in the conductive status irrespective of a case where an off signal is inputted to the gate from the drive circuit 68. When the short circuit failure occurs in the winding group 801, a winding wire in either of the phases and the power supply line are in a sky fault or a winding wire in either of the phases and the ground line is in a ground fault.

The open circuit failure is defined as a condition where, in the inverter 601 or the winding group 801, any portion between wirings is non-conductive status against a control intending a conductive status.

When the open failure occurs in the inverter 601, a portion between a drain and a source in either of the MOSs 611-616 in the upper and lower arms in each phase is in the non-conductive status irrespective of a case where an on signal is inputted to the gate from the drive circuit 68. When the open failure occurs in the winding group 801, the winding wire in any of the phases, or a connection portion between the winding wire and a terminal is disconnected (in a non-connection status).

The failure detection portion 751 detects a failure of the inverter 601 or the winding group 801 based on the phase current detection values Iu1, Iv1, Iw1 detected by the current sensor 701 and the input voltage Vr1 of the inverter 601.

When the failure detection portion 751 detects a failure in the first system, the failure detection portion 751 stops an output to the inverter 601. As a manner to stop the output, the current instruction values Id1*, Iq1* instructed by the current instruction value calculation portion 151 may become equal to 0. All drive signals from a drive circuit 58 to the MOSs 611-616 may be turned off. When there is no possibility to re-energization in a few moment, a power supply relay 521 provided to the power supply line of the inverter 601 on a circuit may be cut off.

The controller 65 keeps driving the motor 80 only with the second system, which is in the normal drive condition. By operating the normally operating system, when one system gets out of order, it is possible to prevent an assist function of the steering torque from being completely lost.

When the inverter 602 in a single system generates an output corresponding to the output generated by the inverters 601, 602 in two systems at the normal drive status, current flowing to the MOSs 621-626 may increase and generated heat may increase. When the MOSs 621-626 ensure sufficient thermal resistance at the time of the drive with a single system, for example, a component having low resistance may be required or a heat sink may be enlarged. Then, a manufacturing cost may increase.

The inventors of the present disclosure have found a switching loss in the PWM control. By reducing the switching loss at the time of the single system drive, heat generation of a MOS may be reduced.

In the PWM control, as a frequency (hereinafter, referred to as a PWM frequency) of the PWM carrier wave is set higher, the switching loss increases and a controllability is improved. In order to prevent a driver in a vehicle from hearing an operation sound, that is, for the purpose of silence, the EPS motor control apparatus 10 that is attached to a steering column uses a frequency of 20 kHz or more. The sound of a frequency of 20 kHz or more corresponds to an upper limit of audible region for a person.

Controllability and a silence may be important for a driver only when two systems operate normally. In the present embodiment, a situation is considered that one system of two systems gets out of order and the remaining one system needs to keep the motor drive.

In this situation, rather than the controllability and the silence, surely ensuring a steering assist function while a vehicle is in an evacuation travelling before arriving at a vehicle dealer for repair may be important. Thus, in the present embodiment, the PWM frequency is reduced at the time of the single system drive status using the normally operating system, as compared with the normal drive status.

A general PWM control will be explained with referring to FIG. 4 and FIG. 5.

Figure 4:
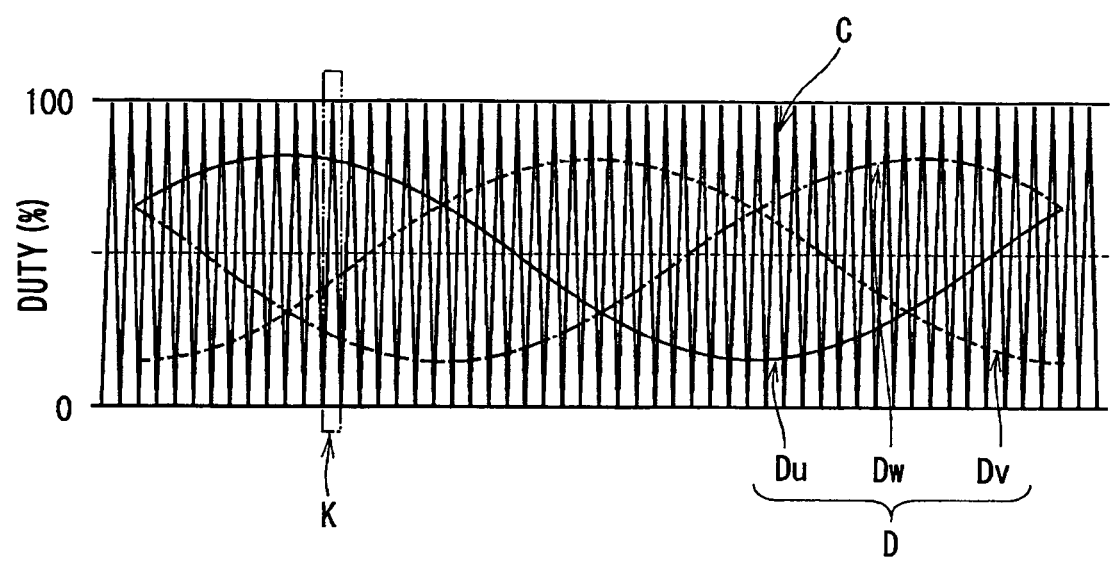
FIG. 4 is a diagram illustrating a time chart of a PWM carrier wave.

As described in FIG. 4, a duty instruction signal D includes a U-phase duty instruction signal Du, a V-phase duty instruction signal Dv, and a W-phase duty instruction signal Dw. Amplitudes of the U-phase duty instruction signal Du, the V-phase duty instruction signal Dv, and the W-phase duty instruction signal Dw are substantially identical. The U-phase duty instruction signal Du, the V-phase duty instruction signal Dv, and the W-phase duty instruction signal Dw are sine wave signals and shifted to each other by 120 degrees. An average value of the maximum and the minimum of the duty instruction signal D correspond to a duty of about 50%.

In the present embodiment, a PWM carrier wave C is a triangular wave. Incidentally, in another example, the PWM carrier wave may be a saw tooth wave. The PWM carrier wave C reciprocates between a lower limit (>0%) and an upper limit (<100%) of the duty in equal cycles.

Figure 5:
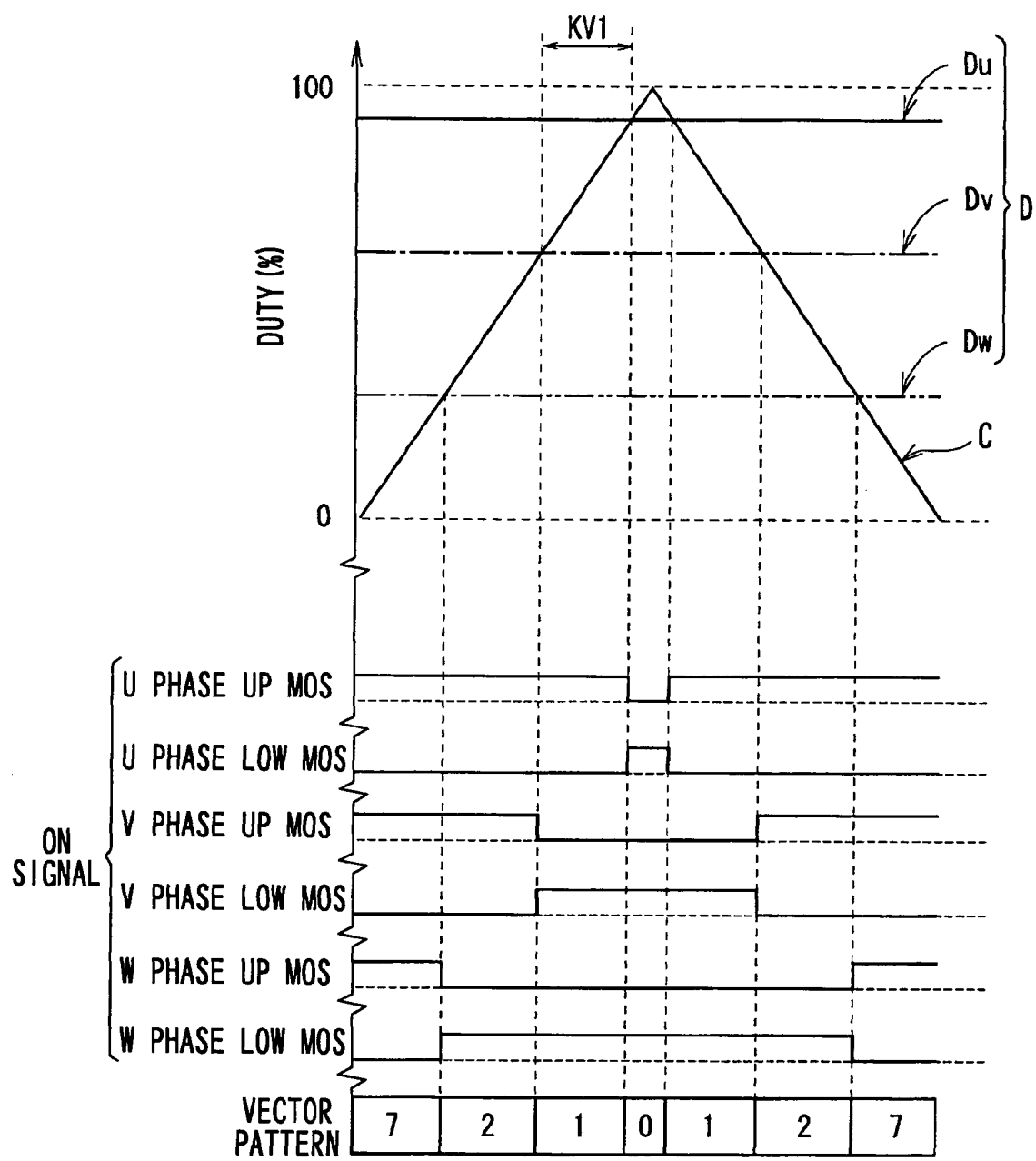
FIG. 5 is a diagram illustrating a time chart of a PWM control.

FIG. 5 is an enlarged view of a region K in FIG. 4, and schematically shows a small-large relation between the PWM carrier wave C and the duty instruction signal D. The PWM control compares the duty instruction signals Du, Dv, Dw in each phase and the PWM carrier wave C, and generates the on/off signal of upper or lower MOSs in each phase.

In the present embodiment, the upper MOS turns on and the corresponding lower MOS turns off in a section where the duty instruction signals Du, Dv, Dw in each phase exceed the PWM carrier wave C. The upper MOS turns off and the corresponding lower MOS turns on in a section where the duty instruction signals Du, Dv, Dw in each phase go below the PWM carrier wave C. For example, in a section KV1, the upper MOS turns on and the lower MOS turns off in the U phase, and the upper MOSs turn off and the lower MOSs turn on in the V phase and the W phase. That is, the section KV1 corresponds to a period of a voltage vector V1, which is described as a vector pattern 1.

As described in FIG. 3, when the failure detection portion 751 detects a failure of the inverter 601 or the winding group 801 in the first system, the failure detection portion 751 notifies the PWM frequency change portion 412 in the second system of the failure. Then, the PWM frequency change portion 412 instructs the carrier wave comparison portion 402 to reduce the PWM frequency (corresponding to a frequency of the PWM carrier wave C).

Figure 6A:
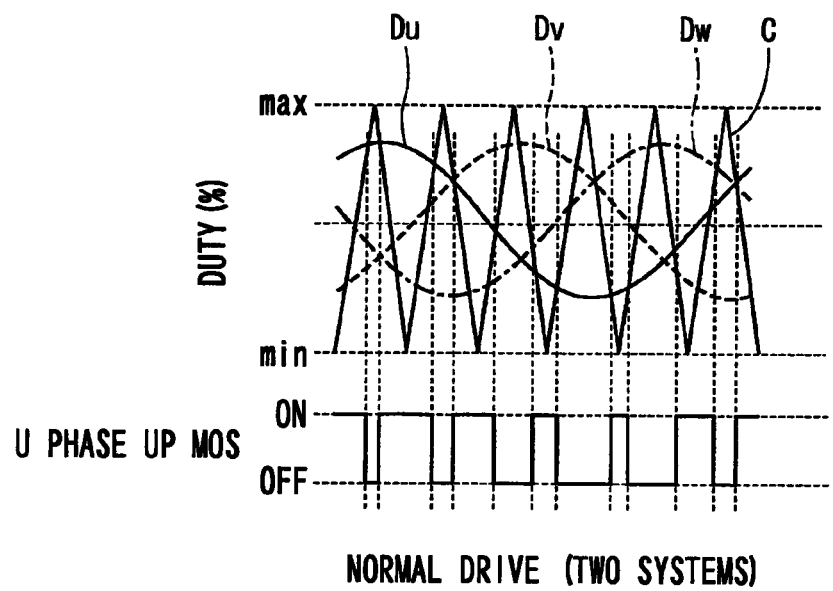
FIG. 6A is a diagram illustrating a time chart of a PWM frequency at the time of a normal drive status using two systems.
Figure 6B:
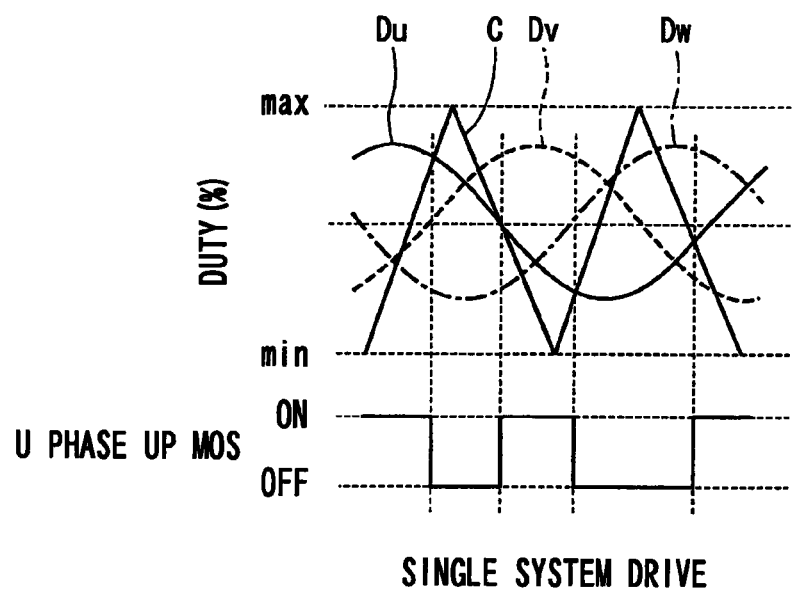
FIG. 6B is a diagram illustrating a time chart of a PWM frequency at the time of a single system drive status.

That is, as described in FIG. 6A and FIG. 6B, the PWM frequency change portion 412 sets the PWM frequency shorter at the time of the single system drive status, as compared to the time of the normal drive status. That is, the PWM frequency change portion 412 sets a PWM cycle longer at the time of the single system drive status, as compared to the time of the normal drive status. For example, when the PWM frequency at the time of the normal drive status is equal to 20 kHz and the cycle is equal to 50 µs, the PWM frequency at the time of the single system drive status is set to 5 kHz and the cycle is set to 200 µs. In this example, the PWM frequency at the time of the single system drive status is equal to one quarter of the PWM frequency of the normal drive status. Incidentally, in FIG. 6A and FIG. 6B, this ratio is not described precisely.

For example, when the PWM frequency is reduced so as to refer to the on/off signal of the upper MOS in the U phase, the number of time of switching per unit time also reduces. As described in present embodiment, when the inverter 601 or the winding group 801 in one system of the two systems gets out of order and the motor 80 keeps driving with a single normal system, the PWM frequency is reduced.

In the present embodiment, when only one system drives, the PWM frequency may be reduced according to element temperature of the normally operating system. More specifically, the PWM frequency may be reduced, as the element temperature of the normally operating system is higher. Incidentally, the element temperature of the normally operating system corresponds to temperature of the MOSs 621-626 in the inverter 602. The element temperature may be a detection temperature that is obtained from a temperature sensor provided to a substrate, or may an estimated temperature that is estimated from a current value detected by the current sensor 702, based on a map or the like.

Figure 7A:
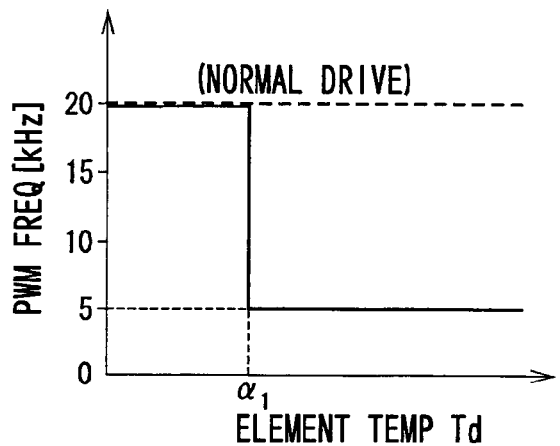
FIG. 7A is a diagram illustrating an example of a characteristic of a PWM frequency and showing a relation between element temperature and the PWM frequency.
Figure 7B:
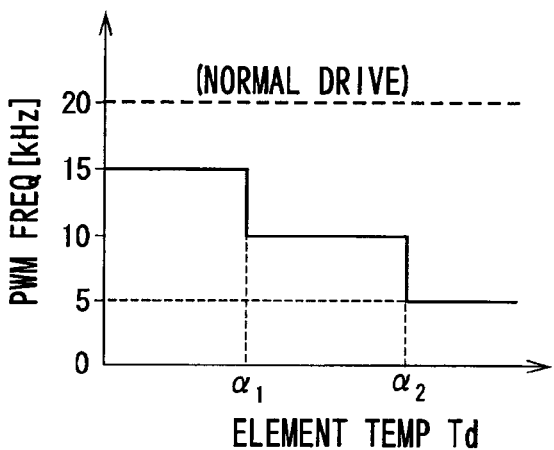
FIG. 7B is a diagram illustrating another example of a characteristic of a PWM frequency and showing a relation between element temperature and the PWM frequency.
Figure 7C:
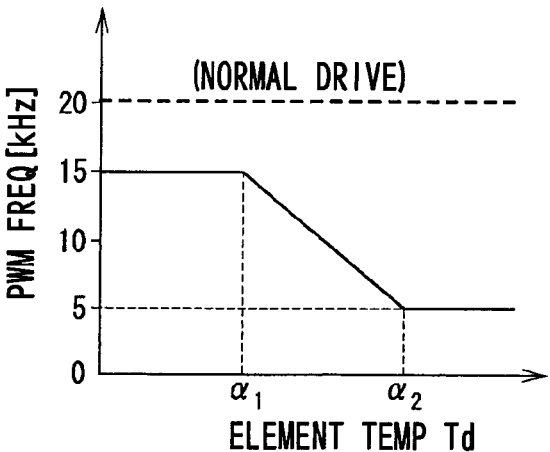
FIG. 7C is a diagram illustrating another example of a characteristic of a PWM frequency and showing a relation between element temperature and the PWM frequency.

FIG. 7A to FIG. 7C show characteristic patterns of the PWM frequency to the element temperature in the normally operating system.

According to a characteristic pattern described in FIG. 7A, when the temperature Td is less than α1, the PWM frequency is set to 20 kHz, which is substantially identical to the normal drive status. When the element temperature is equal to or more than α1, the PWM frequency is set to 5 kHz. According to the characteristic pattern, the PWM frequency is changed in two steps simply.

According to the characteristic pattern described in FIG. 7B, while the element temperature Td increases from α1 to α2, the PWM frequency is reduced in a step-by-step manner. That is, when the element temperature is less than α1, the PWM frequency is set to 15 kHz. While the element temperature is between α1 and α2, the PWM frequency is set to 10 kHz. When the element temperature is equal to or more than α2, the PWM frequency is set to 5 kHz.

According to the characteristic pattern described in FIG. 7C, as the element temperature increases from α1 to α2, the PWM frequency is reduced from 15 kHz to 5 kHz linearly.

Instead of the element temperature, a drive load of the rotary machine may be used. That is, as the drive load of the rotary machine is higher, the PWM frequency may be reduced. In this case, the drive load of the rotary machine may be determined by a parameter that correlates to the drive load. The parameter is, for example, a current detection value in the normally operating system, a current instruction value, a steering torque, or the like. In this case, the element temperature in the lateral axis in FIG. 7A to FIG. 7C may be substituted for each parameter, and the PWM frequency may be set according to various characteristic patterns.

In the present embodiment, as described in FIG. 3, when the failure detection portion 751 detects the failure in the first system, the failure detection portion 751 notifies the current instruction value calculation portion 152 in the second system of occurrence of the failure.

Figure 8:
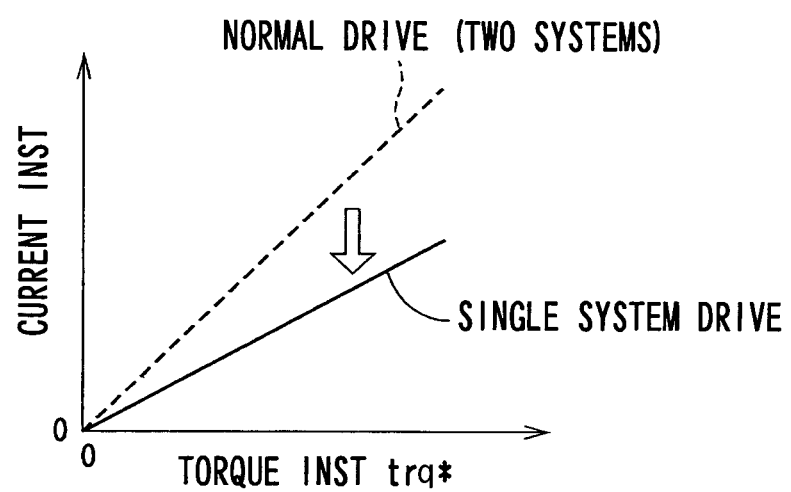
FIG. 8 is a diagram illustrating an example of a reduction of an output gain at the time of the single system drive status in comparison with a case of the normal two-system drive status.

As described in FIG. 8, the current instruction value calculation portion 152 may reduce an output gain of the current instruction values Id*2, Iq*2 to the input of the torque instruction trq*, as compared with the time of the normal drive status, and may limit current flowing to the inverter 602 at the time of the single system drive status. Incidentally, the normal drive status is a status where the two systems drive normally. In another embodiment, a vehicle speed or the like may be input instead of or in addition to the torque instruction trq*.

Incidentally, when a motor control apparatus has a portion setting the maximum current limit value that is an upper limit of the current instruction value other than the current instruction value calculation portion 152, and when the failure detection portion 751 detects a failure of the first system, the maximum current limit value in the second system may be reduced.

Advantages of the motor control apparatus 10 in the first embodiment will be explained.

(1) In the present embodiment, when the inverter 601 or the winding group 801 in one system of the two systems gets out of order and the motor 80 keeps driving only with the normally operating system, the PWM frequency change portion 412 in the normally operating system transmits an instruction to the carrier wave comparison portion 402 to reduce the PWM frequency, for example, from 20 kHz to 5 kHz. Accordingly, it may be possible that, at the time of the normal drive status in which the motor 80 is driven by the two systems, controllability and silence are ensured, and at the time of the single system drive status, the switching loss of the inverter 602 in the normally operating system is reduced.

Figure 9A:
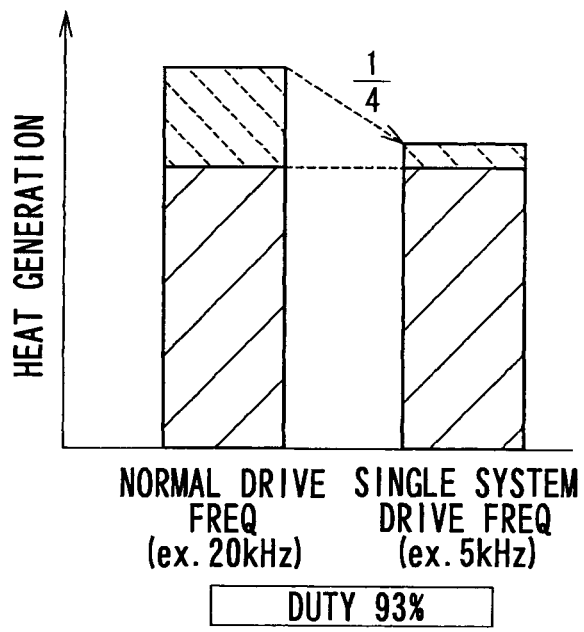
FIG. 9A is a diagram illustrating an example of the amount of a change of heat generation when a duty is equal to 93%.
Figure 9B:
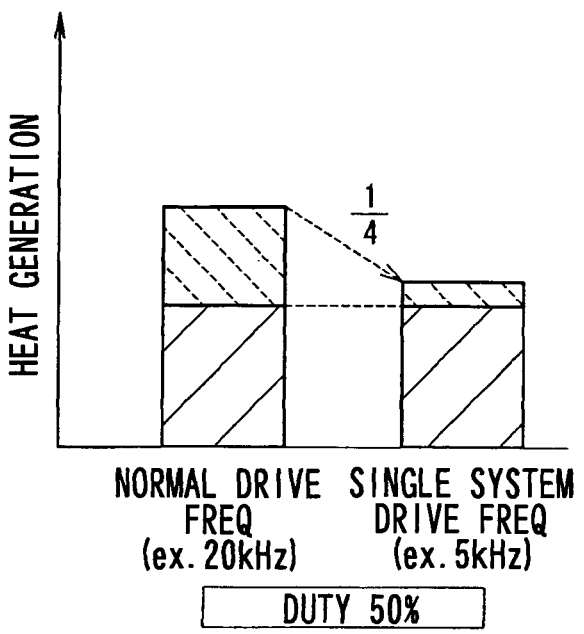
FIG. 9B is a diagram illustrating an example of the amount of a change of heat generation when a duty is equal to 50%.

FIG. 9A and FIG. 9B present a reduction of the amount of heat generation of a MOS based on actually measured data when the PWM frequency is changed. The amount of heat generation of the MOS includes an on-resistance loss (corresponding to a steady loss) that is generated in an on status and a switching loss that is generated according to a switching operation. The on-resistance loss is constant according to an output of a load. The switching loss can be reduced by reducing the number of times of switching per unit time. In the present embodiment, by setting the PWM frequency to one quarter, the switching loss may be reduced to one quarter.

When the duty is equal to 93%, as described in FIG. 9A, it may be possible to reduce the amount of heat generation of the MOS by 5% or more. FIG. 9A and FIG. 9B conceptually illustrate a change of the amount of heat generation in a MOS. When the duty is equal to 50%, as described in FIG. 9B, since the amount of the on-resistance loss is reduced and a degree of contribution of the switching loss is relatively enlarged, a reduction effect of the amount of heat generation of the MOS is enhanced.

Thus, by reducing the switching loss, without using a low resistance parts and increasing a size of a heat sink, it may be possible to improve caloric performance of the control apparatus.

Incidentally, in FIG. 9A and FIG. 9B, a bar graph described with a solid oblique line presents the on resistance loss (the steady loss), and a bar graph described with a dot oblique line presents the switching loss.

(2) By reducing the PWM frequency according to the element temperature or a parameter such as the current detection value, the current instruction value, the steering torque, it is possible to properly reduce the switching loss while reflecting necessity for preventing heat generation more accurately.

(3) In the present embodiment, the PWM frequency after lowering the frequency is set from 20 Hz to 20 kHz that correspond to an audible region for a person. More preferably, the PWM frequency after lowering the frequency is set to less than 10 kHz that can be heard by many people even when an individual difference is considered. Accordingly, it may be possible that the EPS motor control apparatus 10 attached to the steering column causes the driver to hear an operation sound, so that the driver finds out an occurrence of a failure. That is, the silence has a priority at the time of the normal drive status and the PWM frequency of 20 kHz is used, so that the driver does not hear a noise. In contrast, at the single system drive status, the noise is made, so that it may be possible to notify the driver of a quick repair handling. It may be possible to notify the driver that a repair or the like is required as soon as possible.

(4) It is considered that the time when the motor 80 is driven by the single system is basically limited to an evacuation travelling to a vehicle dealer or the like. Based on this supposition, the current instruction value calculation portion 152 reduces the output gain of the current instruction value with respect to the torque instruction input at the time of the single system drive status, and current flowing to the inverter 602 is limited. Accordingly, by combining the reduction effect of the switching loss according to the lowering of the PWM frequency, it may be possible to prevent heat generation of a MOS more preferably.

Incidentally, when the maximum current limit value, which is the upper limit of the current instruction value, is lowered at the time of the single system drive status, the effects similar to the present embodiment will be obtained.

Second Embodiment

A second embodiment will be explained with referring to FIG. 10 to FIG. 12.

The motor control apparatus 10 in the second embodiment operates the switching elements 611-616, 621-626 of the inverters 601, 602 by a three-phase modulation process in the PWM control at the time of the normal drive status, and controls the three-phase AC motor 80.

Figure 10:
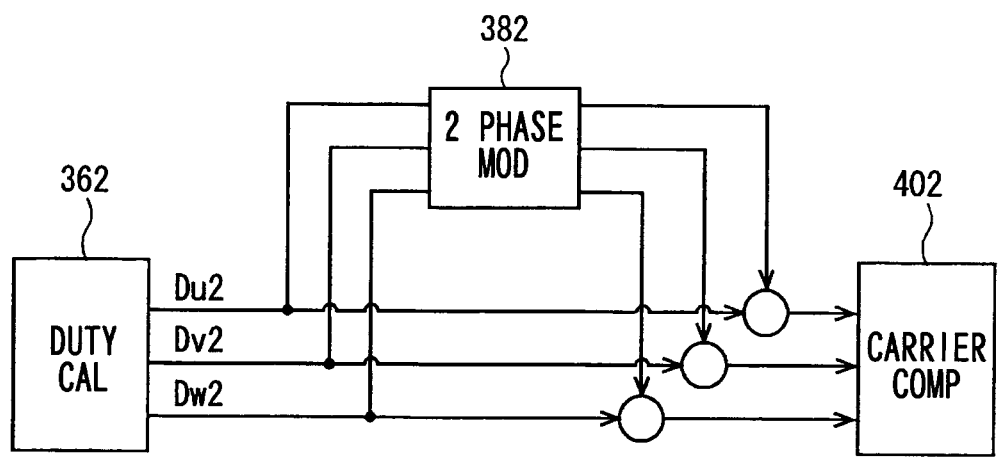
FIG. 10 is a block diagram partially illustrating the motor control apparatus in a second embodiment.

FIG. 10 describes that the controller 65 has a two-phase modulation process portion 382 between the duty calculation portion 362 and the carrier wave comparison portion 402. In FIG. 10, the second system is described as an example. The two-phase modulation process portion 382 performs a flattop two-phase modulation process or a flatbed two-phase modulation process. The two-phase modulation process portion 382 adds the two-phase modulation process to the duty instruction signals Du, Dv, Dw in each phase calculated by the duty calculation portion 362, and outputs to the carrier wave comparison portion 402. The duty instruction signals Du, Dv, Dw in each phase correspond to a voltage instruction signal.

Incidentally, the flattop two-phase modulation process and the flatbed two-phase modulation process are described in Japanese patent No. 5045799.

Figure 11:
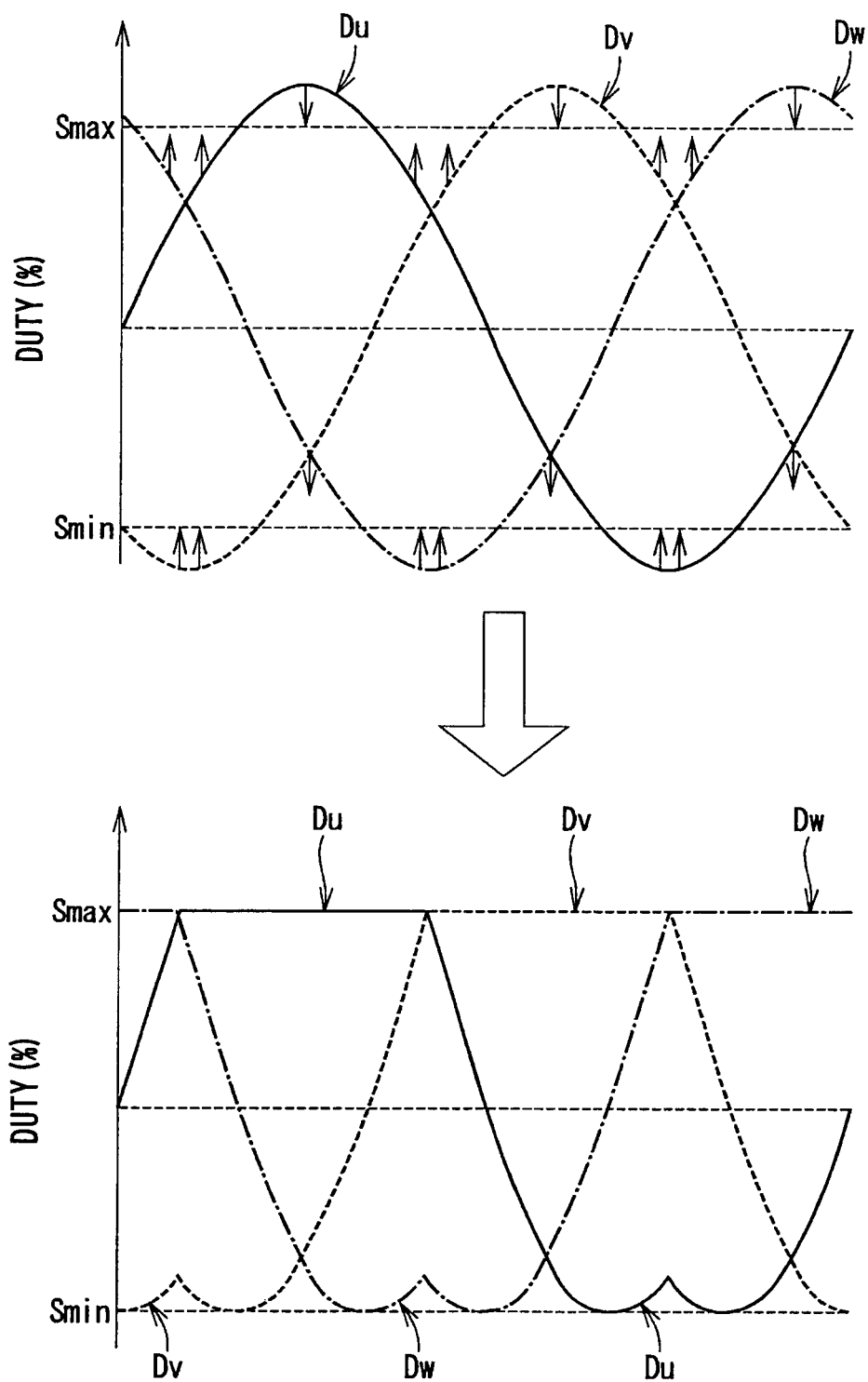
FIG. 11 is a diagram explaining a flattop two-phase modulation process.

As described in FIG. 11, the flattop two-phase modulation process subtracts, from the voltage instruction signals of all phases, a difference value derived by subtracting a predetermined upper limit value Smax from the greatest voltage instruction signal so that the greatest voltage instruction signal in the voltage instruction signals Du, Dv, Dw corresponding to the three phases has the predetermined upper limit value Smax.

Figure 12:
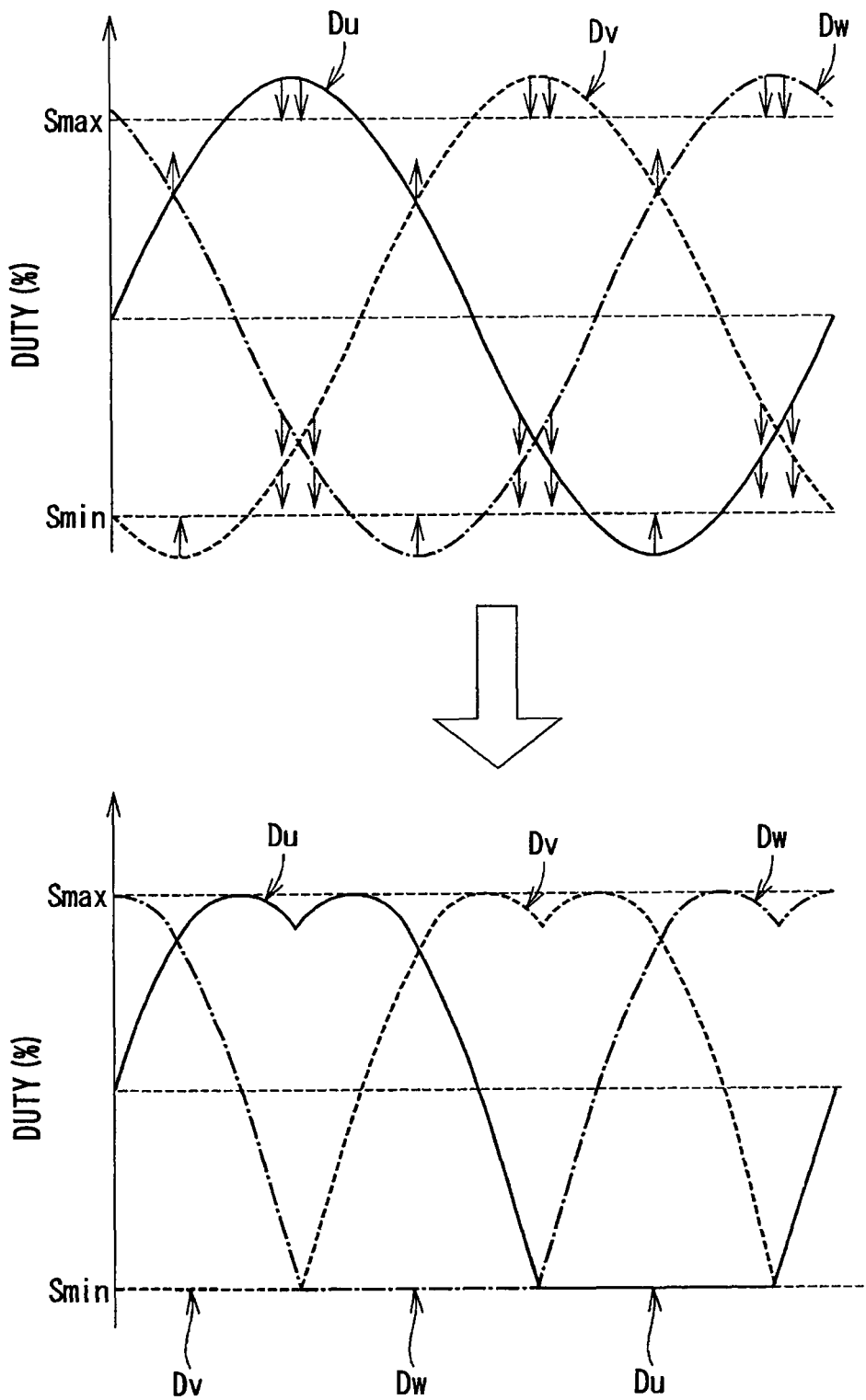
FIG. 12 is a diagram explaining a flatbed two-phase modulation process.

As described in FIG. 12, the flatbed two-phase modulation process subtracts, from the voltage instruction signals of all phases, a difference value derived by subtracting a predetermined lower limit value Smin from the smallest voltage instruction signal so that the smallest voltage instruction signal in the voltage instruction signals Du, Dv, Dw corresponding to the three phases has the predetermined lower limit value Smin.

The flatbed two-phase modulation process will be explained below. Base sine waves, which serve as reference, are modulated by subtracting, from all phases, a difference between a duty of the smallest phase and a minimum reference value (i.e., a difference calculated by subtracting a minimum reference value from the duty of the smallest phase), so that the duty of the smallest phase becomes the minimum reference value.

The flattop two-phase modulation process will be explained below. Base sine waves are modulated by subtracting, from all phases, a difference between a duty of the greatest phase and a maximum reference value (i.e., a difference calculated by subtracting a maximum reference value from the duty of the greatest phase), so that the duty of the greatest phase becomes the maximum reference value.

A comparative example, in which a first duty instruction signal that has undergone the flatbed two-phase modulation process and a second duty instruction signal that has undergone the flattop two-phase modulation process have the same phase (i.e., in phase) will be explained.

A minimum value in a first duty instruction-signal is substantially equal to the minimum value of an allowable duty output range, and the maximum value in the first duty instruction signal is only slightly greater than a center output value. The maximum value of a second duty instruction signal is substantially equal to the maximum value of an allowable duty output range, and the minimum value of the second duty instruction signal is only slightly smaller than a center output value. The maximum value of the first duty instruction signal and the minimum value of the second duty instruction signal are substantially symmetrical relative to the center output value. Further, a timing when the first duty instruction signal takes the maximum value and a timing when the second duty instruction signal takes the minimum value overlap at every 60 degrees, thus the first duty instruction signal and the second duty instruction signal intersect with each other.

The greatest U-phase duty in the first duty instruction signal is greater than the smallest W-phase duty in the second duty instruction signal. Therefore, when the first PWM reference signal and the second PWM reference signal are controlled to have the same phase, the discharge period of a second system, which is a generation period of the effective voltage vector of the second PWM reference signal, becomes longer than the charge period of a first system, which is a generation period of the zero voltage vector on the mountain side of the first PWM reference signal. Therefore, the capacitor discharge period of the first system and the capacitor discharge period of the second system overlap with each other twice in one cycle of the voltage instruction, thereby causing an increase of the ripple electric current.

The minimum value of the allowable duty output range can be set to 0%, and the maximum value can be set to 100%. In such a case, the center output value which is the center value of the duty range is set to 50%.

The first PWM reference signal regarding driving of an inverter unit and the second PWM reference signal regarding driving of another inverter unit are chopping wave signals with a frequency of 20 kHz, that is, with a cycle time of 50 μs.

A case where the phase is advanced by 30 degrees will be explained. The phase of the second duty instruction signal is advanced by 30 degrees from the phase of the first duty instruction signal. In such case, a timing when the second duty instruction signal takes the minimum value and a timing when the first duty instruction signal takes the maximum value are phase-shifted by 30 degrees from each other. That is, the second duty instruction signal takes the minimum value right in the middle (i.e., at a right center) of two timings when the first duty instruction signal takes the maximum value at every 60 degrees.

The U-phase duty which is the greatest in the first duty instruction signal is smaller than the W-phase duty which is the smallest in the second duty instruction signal.

When the first PWM reference signal and the second PWM reference signal are controlled to have the same phase, the charge period of the first system, which is a generation period of the zero voltage vector on the mountain side of the first PWM reference signal, becomes longer than the discharge period of the second system, which is a generation period of the effective voltage vector of the second PWM reference signal. Therefore, capacitor discharge periods of the first and second systems have no overlap. Thus, the ripple electric current is reduced.

The flattop two-phase modulation process and the flatbed two-phase modulation process may improve voltage utilization rate by operating averaged value of the instruction duty based on a fundamental wave (sine wave). A waveform of a three-phase voltage may be distorted. When a current sensor detects a phase current at a peak and a valley of the carrier wave, it may be impossible to ensure a detection time according to a setting of the upper limit value and the lower limit value of the duty. Thus, in the second embodiment, the flattop two-phase modulation process and the flatbed two-phase modulation process are not performed at the time of the normal drive status. The flattop two-phase modulation process and the flatbed two-phase modulation process are performed only at the time of the single system drive status.

The second embodiment may be combined with the first embodiment. That is, when the failure detection portion 751 detects a failure of the inverter 601 or the winding group 801 in the first system, the flattop two-phase modulation process and the flatbed two-phase modulation process may be executed by conjunction with a process lowering the PWM frequency in the second system.

Alternatively, without combining with the first embodiment, only the flattop two-phase modulation process and the flatbed two-phase modulation process may be executed while remaining the PWM frequency at the time of the normal drive status.

In the second embodiment, at the time of the normal drive status, by changing from the three-phase modulation process to the flattop two-phase modulation process and the flatbed two-phase modulation process, it may be possible to reduce the number of times of switching per unit time to two thirds. Since the power utilization rate is improved by the flattop two-phase modulation process and the flatbed two-phase modulation process, it may be possible to prevent heat generation of the switching elements 621-626 that output electrical power equal to the normal drive status to a rotary machine.

Third Embodiment

A third embodiment will be explained with referring to FIG. 13.

The motor control apparatus 10 in the third embodiment operates a switching operation of the inverter 602 by a pulse wave control instead of the PWM control, when the failure of the inverter 601 or the winding group 801 in the first system is detected and the motor 80 is driven only by the second system.

JP 2011-35991A1 (corresponding to US2011/0025240A1) and JP 2013-162660A1 (corresponding to US2013/0200830A1) disclose the pulse wave control. The pulse wave control operates a switching of a switching element based on a pulse waveform of output voltage, the pulse waveform being synchronized with an electric angle of the motor 80. Specifically, according to a modulation rate, a voltage phase, and the number of times of switching in a predetermined period, a suitable pulse waveform is selected with referring to a map or like.

Figure 13:
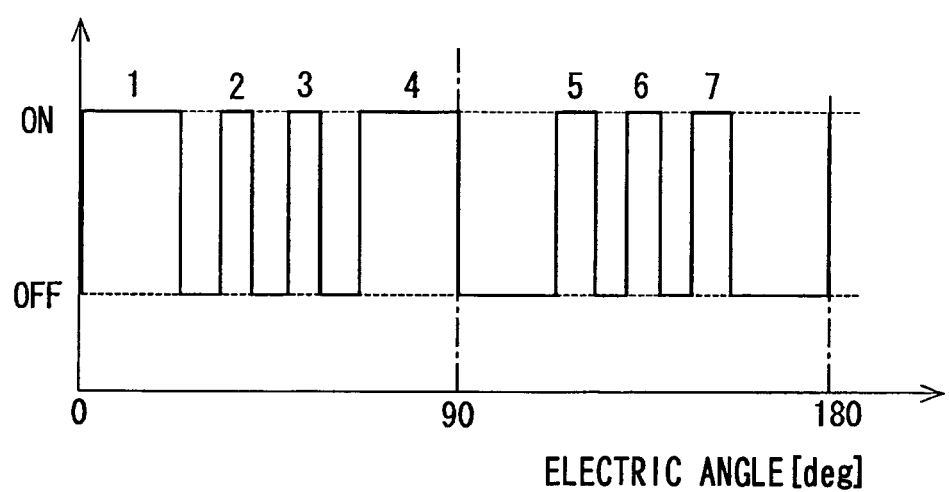
FIG. 13 is a diagram illustrating a pulse waveform used in the motor control apparatus in a third embodiment.

FIG. 13 shows an example of a pulse waveform that deleting fifth harmonic components. The number of times of switching in an electric cycle of ½ is set to seven. Thus, it may be possible to extremely reduce the number of times of switching according to a selected pulse waveform, and it may be possible to reduce the switching loss.

The pulse wave control may have a poor controllability as compared to the PWM control, and may have difficulty in harmonic and noise, and therefore, there may be a demerit at the time of the normal drive status in the EPS motor control. The pulse wave control may be used at the time of the single system drive status by the normally operating system. This situation is considered in the present disclosure.

Thus, according to the present embodiment, it may be possible to achieve the effect similar to another embodiment using the PWM control with a control apparatus controlling by the pulse waveform. The present disclosure is not limited to a control apparatus controlling electricity supply of a motor by a PWM control.

Other Embodiments (1) It should be noted that the control apparatus of the rotary machine in the first embodiment is not limited to a control apparatus controlling a drive of a three-phase AC motor with multiple systems of inverters. The control apparatus of the rotary machine in the first embodiment may be used in a control apparatus that controls a drive of a direct current (DC) motor with multiple systems of H bridge circuits. In this case, the multiple systems of H bridge circuits may correspond to an example of an electric power converter.

The control apparatus of the rotary machine in the first embodiment and the third embodiment is not limited to a three-phase AC motor. Instead, the control apparatus of the rotary machine may be used in a multiphase AC motor of four phases or more.

(2) The multiple systems of the electric power converter (corresponding to the inverters, and the H bridge circuit) are not limited to two systems, and instead, the multiple systems of the electric power converters may be three systems or more. In this case, when one or more systems of multiple systems get out of order, and a drive remains with a normally operating system of a single system or more, a configuration similar to the present embodiments may be used with respect to a PWM frequency or the like of each normal system.

(3) A specific configuration of the motor control apparatus 10 is not limited to the present embodiment. For example, the switching element may be a field-effect transistor or an insulated gate bipolar transistor (IGBT) other than a MOSFET.

(4) The three-phase current flowing to the two systems of the winding group is not limited to the identical phase, and phases of the three-phase current may be shifted.

(5) The control apparatus of the rotary machine in the present disclosure is not limited to a control apparatus used as an EPS motor control apparatus. The control apparatus of the rotary machine may be used as an apparatus for a vehicle other than an electric power steering apparatus, or a control apparatus of a motor or a generator in various apparatus other than an apparatus for a vehicle.

According to one aspect of the present disclosure, a control apparatus controlling a drive of a rotary machine with multiple winding groups is provided.

The control apparatus controls drive of the rotary machine that has multiple winding groups. The control apparatus of a rotary machine includes electric power converters in multiple systems, a failure detection portion, and a controller. Each of the electric power converters has a switching element in an upper arm and a switching element in a lower arm, and converts direct current power by a switching operation to supply to a corresponding winding group that corresponds to each of the electric power converters. The switching element in the upper arm and the switching element in the lower arm are bridge connected. The failure detection portion detects a failure of an electric power converter or a failure of a winding group. The controller operates the switching elements in the electric power converters and controls electricity supply to the winding groups in the rotary machine for each of the multiple systems. When the failure detection portion detects the failure of the electric power converters or the failure of the winding group in any one of the systems, the controller stops output to an electric power converter in a failure system of the electric power converters, and the controller reduces a total number of times of switching per unit time of the switching elements in an electric power converter in a normally operating system of the electric power converters, as compared to a normal drive status. In the normal drive status, all of the electric power converters and all of the winding groups in the systems operate normally. Thus, by reducing the number of times of switching per unit time and by reducing the switching loss in the electric power converter of the normally operating system, it may be possible to improve power efficiency and to prevent heat generation, rather than controllability and silence.

In addition, in the control apparatus that operates a switching element in an electric power converter with a PWM control and controls a drive of the rotary machine, the controller may include a PWM frequency change portion changing a PWM frequency. The controller may reduce the PWM frequency with respect to the electric power converter in a normally operating system when either of the systems gets out of order, as compared to the case of the normal drive status. For example, it is supposed that the PWM frequency at the normal drive status is set to 20 kHz. The PWM frequency change portion may change the PWM frequency of the electric power converter in the normally operating system at the time of failure of either of the systems to 5 kHz, which is one quarter at the time of the normal drive status.

In this case, the PWM frequency may be reduced as temperature of a switching element configuring an electric power converter is higher or as a driving load in a rotary machine is higher. The temperature of the switching element may be a detection temperature or an estimation temperature. The driving load of the rotary machine may be determined by a parameter that correlates with the driving load. The parameter may be a current detection value, a current instruction value, a steering torque, or the like.

When the PWM frequency is set to 20 Hz to 20 kHz that correspond to an audible frequency range for a person, it may be possible to notify a driver of an occurrence of a failure.

In addition, it is supposed that the control apparatus controls a switching element in an electric power converter by a three-phase modulation process in a PWM control and controls a driving of a three-phase rotary machine in a normal driving. When a failure detection portion has detected a failure of an electric power converter or a winding group in either of the systems, the PWM frequency change portion may reduce the PWM frequency and, in addition to or instead of the process, the controller may perform the flattop two-phase modulation process or the flatbed two-phase modulation process.

As described in Japanese Patent No. 5045799, the flattop two-phase modulation process is a process that subtracts, from the voltage instruction signals of all of the three phases, a difference value derived by subtracting a predetermined upper limit value from the greatest voltage instruction signal among the voltage instruction signals of the three phases, so that the greatest voltage instruction signal in the voltage instruction signals has the predetermined upper limit value. The flatbed two-phase modulation process is a process that subtracts, from the voltage instruction signals of all of the three phases, a difference value derived by subtracting a predetermined lower limit value from the smallest voltage instruction signal among the voltage instruction signals of the three phases, so that the smallest voltage instruction signal in the voltage instruction signals has the predetermined lower limit value.

The three-phase modulation process at the time of the normal drive status is changed to the two-phase modulation process, and the total number of times of switching per unit time may be reduced to two thirds. Power utilization may be improved and, it may be possible to prevent the switching element from generating heat while outputting the identical electric power to the rotary machine.

In addition, the controller may include a current instruction value calculation portion that calculates, based on a predetermined input such as a torque instruction, a current instruction value of current energized to the winding group in the rotary machine. When the failure detection portion detects a failure in either of the systems, the current instruction value calculation portion may reduce a gain of the output with respect to the input regarding the power instruction value in the normally operating system.

Incidentally, this process is based on an assumption that the rotary machine is driven only with the normally operating system only at the time of the evacuation travelling to a vehicle dealer or the like. Accordingly, it may be possible to prevent the switching element from generating heat more effectively by combining a reduction of a switching loss due to lowering of the number of times of switching.

The EPS motor control apparatus 10 may correspond to an example of a control apparatus of a rotary machine. The inverters 601, 602 may correspond to an example of an electric power converter. The motor 80 may correspond to an example of a rotary machine.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A control apparatus of a rotary machine, the control apparatus controlling drive of the rotary machine that has a plurality of winding groups, the control apparatus comprising:
electric power converters in a plurality of systems, each of the electric power converters having a switching element in an upper arm and a switching element in a lower arm, and converting direct current power by a switching operation to supply to a corresponding winding group that corresponds to each of the electric power converters, wherein the switching element in the upper arm and the switching element in the lower arm are bridge connected;
a failure detection portion detecting a failure of an electric power converter or a failure of a winding group; and
a controller operating the switching elements in the electric power converters and controlling electricity supply to the winding groups in the rotary machine for each of the plurality of systems;
wherein:
when the failure detection portion detects the failure of the electric power converters or the failure of the winding group in any one of the systems,
the controller stops output to an electric power converter in a failure system of the electric power converters, and
the controller reduces a total number of times of switching per unit time of the switching elements in an electric power converter in a normally operating system of the electric power converters, as compared to a normal drive status; and
in the normal drive status, all of the electric power converters and all of the winding groups in the systems operate normally, and
wherein:
the control apparatus of the rotary machine operates the switching elements in the electric power converters by a PWM control to control the drive of the rotary machine;
the controller includes a PWM frequency change portion changing a PWM frequency that is a frequency of a PWM carrier wave; and
when the failure detection portion detects the failure of the electric power converters or the failure of the winding group in any one of the systems,
the PWM frequency change portion reduces the PWM frequency of the electric power converter in the normally operating system, as compared to the normal drive status, and
when the failure detection portion detects the failure of the electric power converters or the failure of the winding group in any one of the systems,
the PWM frequency change portion sets the PWM frequency of 20 Hz to 20 kHz regarding the electric power converter in the normally operating system; and the PWM frequency of 20 Hz to 20 kHz is an audible frequency for a person.

2. The control apparatus of the rotary machine according to claim 1, wherein:
when the failure detection portion detects the failure of the electric power converters or the failure of the winding group in any one of the systems,
the PWM frequency change portion reduces the PWM frequency of the electric power converter in the normally operating system, as temperature of a switching element of the electric power converter in the normally operating system is higher or a drive load of the rotary machine is higher.

3. A control apparatus of a rotary machine, the control apparatus controlling drive of the rotary machine that has a plurality of winding groups, the control apparatus comprising
electric power converters in a plurality of systems, each of the electric power converters having a switching element in an upper arm and a switching element in a lower arm, and converting direct current power by a switching operation to supply to a corresponding winding group that corresponds to each of the electric power converters, wherein the switching element in the upper arm and the switching element in the lower arm are bridge connected;
a failure detection portion detecting a failure of an electric power converter or a failure of a winding group; and
a controller operating the switching elements in the electric power converters and controlling electricity supply to the winding groups in the rotary machine for each of the plurality of systems;
wherein:
when the failure detection portion detects the failure of the electric power converters or the failure of the winding group in any one of the systems,
the controller stops output to an electric power converter in a failure system of the electric power converters, and
the controller reduces a total number of times of switching per unit time of the switching elements in an electric power converter in a normally operating system of the electric power converters, as compared to a normal drive status; and
in the normal drive status, all of the electric power converters and all of the winding groups in the systems operate normally, and
wherein:
the control apparatus of the rotary machine operates the switching elements in the electric power converters by a PWM control to control the drive of the rotary machine;
the controller includes a PWM frequency change portion changing a PWM frequency that is a frequency of a PWM carrier wave; and
when the failure detection portion detects the failure of the electric power converters or the failure of the winding group in any one of the systems,
the PWM frequency change portion reduces the PWM frequency of the electric power converter in the normally operating system, as compared to the normal drive status, and
in the normal drive status, the control apparatus of the rotary machine operates the switching elements in the electric power converters by a three-phase modulation process of the PWM control, and controls the drive of the rotary machine;

the rotary machine is a three-phase rotary machine;

when the failure detection portion detects the failure of the electric power converters or the failure of the winding group in any one of the systems, the controller further executes a flattop two-phase modulation process or a flatbed two-phase modulation process with respect to the electric power converter that is in the normally operating system;

in the flattop two-phase modulation process, the control unit subtracts, from voltage instruction signals of all of three phases, a difference value derived by subtracting a predetermined upper limit value from a greatest voltage instruction signal among the voltage instruction signals of the three phases, so that the greatest voltage instruction signal in the voltage instruction signals respectively corresponding to the three phases has the predetermined upper limit value; and in the flatbed two-phase modulation process, the control unit subtracts, from the voltage instruction signals of all of the three phases, a difference value derived by subtracting a predetermined lower limit value from a smallest voltage instruction signal among the voltage instruction signals of the three phases, so that the smallest voltage instruction signal in the voltage instruction signals respectively corresponding to the three phases has the predetermined lower limit value.

4. The control apparatus of the rotary machine according to claim 1, wherein:

in the normal drive status, the control apparatus of the rotary machine operates the switching elements in the electric power converters by a three-phase modulation process of the PWM control, and controls the drive of the rotary machine;

the rotary machine is a three-phase rotary machine;

when the failure detection portion detects the failure of the electric power converters or the failure of the winding group in any one of the systems, the controller executes a flattop two-phase modulation process or a flatbed two-phase modulation process with respect to the electric power converter that is in the normally operating system;

in the flattop two-phase modulation process, the control unit subtracts, from voltage instruction signals of all of three phases, a difference value derived by subtracting a predetermined upper limit value from a greatest voltage instruction signal among the voltage instruction signals of the three phases, so that the greatest voltage instruction signal in the voltage instruction signals respectively corresponding to the three phases has the predetermined upper limit value; and in the flatbed two-phase modulation process, the control unit subtracts, from the voltage instruction signals of all of the three phases, a difference value derived by subtracting a predetermined lower limit value from a smallest voltage instruction signal among the voltage instruction signals of the three phases, so that the smallest voltage instruction signal in the voltage instruction signals respectively corresponding to the three phases has the predetermined lower limit value.

5. The control apparatus of the rotary machine according to claim 1, wherein:

the controller includes a current instruction value calculation portion that calculates a current instruction value regarding current supplied to the winding groups of the rotary machine based on a predetermined input;

when the failure detection portion detects the failure of the electric power converters or the failure of the winding group in any one of the systems, the current instruction value calculation portion reduces output gain to the predetermined input of the electric power converter that is in the normally operating system.

6. The control apparatus of the rotary machine according to claim 3, wherein:

when the failure detection portion detects the failure of the electric power converters or the failure of the winding group in any one of the systems, the PWM frequency change portion reduces the PWM frequency of the electric power converter in the normally operating system, as temperature of a switching element of the electric power converter in the normally operating system is higher or a drive load of the rotary machine is higher.

7. The control apparatus of the rotary machine according to claim 3, wherein:

the controller includes a current instruction value calculation portion that calculates a current instruction value regarding current supplied to the winding groups of the rotary machine based on a predetermined input;

when the failure detection portion detects the failure of the electric power converters or the failure of the winding group in any one of the systems, the current instruction value calculation portion reduces output gain to the predetermined input of the electric power converter that is in the normally operating system.

8. A control apparatus of a rotary machine, the control apparatus controlling drive of the rotary machine that has a plurality of winding groups, the control apparatus comprising:

electric power converters in a plurality of systems, each of the electric power converters having a switching element in an upper arm and a switching element in a lower arm, and converting direct current power by a switching operation to supply to a corresponding winding group that corresponds to each of the electric power converters, wherein the switching element in the upper arm and the switching element in the lower arm are bridge connected;

a failure detection portion detecting a failure of an electric power converter or a failure of a winding group; and a controller operating the switching elements in the electric power converters and controlling electricity supply to the winding groups in the rotary machine for each of the plurality of systems, wherein:

when the failure detection portion detects the failure of the electric power converters or the failure of the winding group in any one of the systems, the controller stops output to an electric power converter in a failure system of the electric power converters, and the controller reduces a total number of times of switching per unit time of the switching elements in an electric power converter in a normally operating system of the electric power converters, as compared to a normal drive status;

in the normal drive status, all of the electric power converters and all of the winding groups in the systems operate normally;

the control apparatus operates the switching elements in the electric power converters by a PWM control to control the drive of the rotary machine;

the controller includes a PWM frequency change portion changing a PWM frequency that is a frequency of a PWM carrier wave;

when the failure detection portion detects the failure of the electric power converters or the failure of the winding group in any one of the systems, the PWM frequency change portion reduces the PWM frequency of the electric power converter in the normally operating system, as compared to the normal drive status; and the PWM frequency change portion sets the PWM frequency, regarding the electric power converter in the normally operating system, to an audible frequency for a person.

9. The control apparatus of the rotary machine according to claim 8, wherein:

when the failure detection portion detects the failure of the electric power converters or the failure of the winding group in any one of the systems, the PWM frequency change portion reduces the PWM frequency of the electric power converter in the normally operating system, as temperature of a switching element of the electric power converter in the normally operating system is higher or a drive load of the rotary machine is higher.

10. The control apparatus of the rotary machine according to claim 8, wherein:

the controller includes a current instruction value calculation portion that calculates a current instruction value regarding current supplied to the winding groups of the rotary machine based on a predetermined input;

when the failure detection portion detects the failure of the electric power converters or the failure of the winding group in any one of the systems, the current instruction value calculation portion reduces output gain to the predetermined input of the electric power converter that is in the normally operating system.

* * * * *